Feb. 28, 1939.  E. F. ROSSMAN ET AL  2,148,839
SHOCK ABSORBER
Filed Aug. 23, 1937  2 Sheets-Sheet 1

INVENTORS
EDWIN F. ROSSMAN AND
FREDERICK D. FUNSTON
BY
Spencer, Hardman and Fehr
ATTORNEYS Feb. 28, 1939.  E. F. ROSSMAN ET AL  2,148,839

SHOCK ABSORBER

Filed Aug. 23, 1937   2 Sheets-Sheet 2

INVENTORS
EDWIN F. ROSSMAN AND
FREDERICK D. FUNSTON
BY
Spencer, Hardman and Fehr
ATTORNEYS Patented Feb. 28, 1939

2,148,839

UNITED STATES PATENT OFFICE 2,148,839

SHOCK ABSORBER

Edwin F. Rossman and Frederick D. Funston, Dayton, Ohio, assignors to General Motors Corporation, Detroit, Mich., a corporation of Delaware Application August 23, 1937, Serial No. 160,442

9 Claims. (Cl. 188—88)

This invention relates to improvements in hydraulic shock absorbers.

It is among the objects of the present invention to provide a hydraulic shock absorber, particularly of the direct acting type, capable of controlling both the approaching and separating movements of two relatively movable members.

Another object of the present invention is to provide a hydraulic shock absorber with adjustable fluid flow controlling means whereby the resisting effect of the shock absorber may be varied at will.

A still further object of the present invention is to provide a hydraulic shock absorber of the direct acting type, having fluid flow controlling means adapted to be adjusted to vary its restriction to fluid flow by rotation of the shock absorber piston within its cylinder.

Further objects and advantages of the present invention will be apparent from the following description, reference being had to the accompanying drawings wherein a preferred embodiment of one form of the invention is clearly shown.

Figure 5:
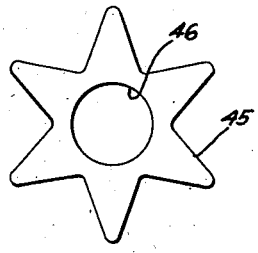
Figure 9:
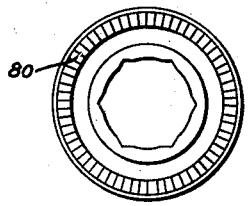
Figure 6:
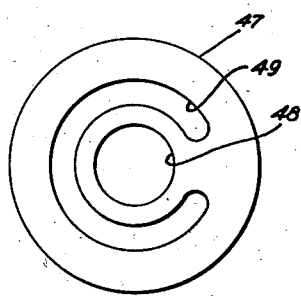
Figure 10:
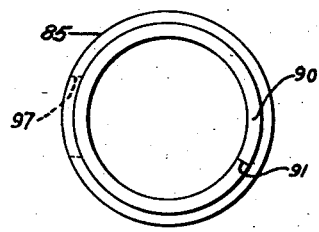
Figure 7:
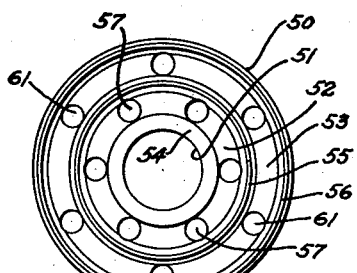
Figure 11:
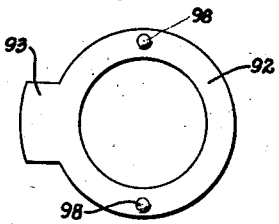
Figure 8:
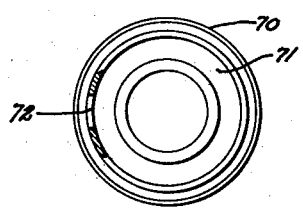

Figs. 5 to 12 inclusive are views showing various elements of the shock absorber, the Fig. 5 illustrating the star-shaped resilient element of one of the fluid flow control devices of the piston;

The Figure 6 showing one of the fluid flow control devices;

The Figure 7 being a detail plan view of the piston block itself;

The Fig. 8 a plan view of the retainer element of the piston, this view being partially sectioned more clearly to illustrate the side opening thereof;

The Fig. 9 being an inverted plan view of the retainer element;

The Fig. 10 a plan view of the sleeve valve rotatably carried by the retainer of the piston;

The Fig. 11 a plan view of the detent or locking element; and

Figure 3:
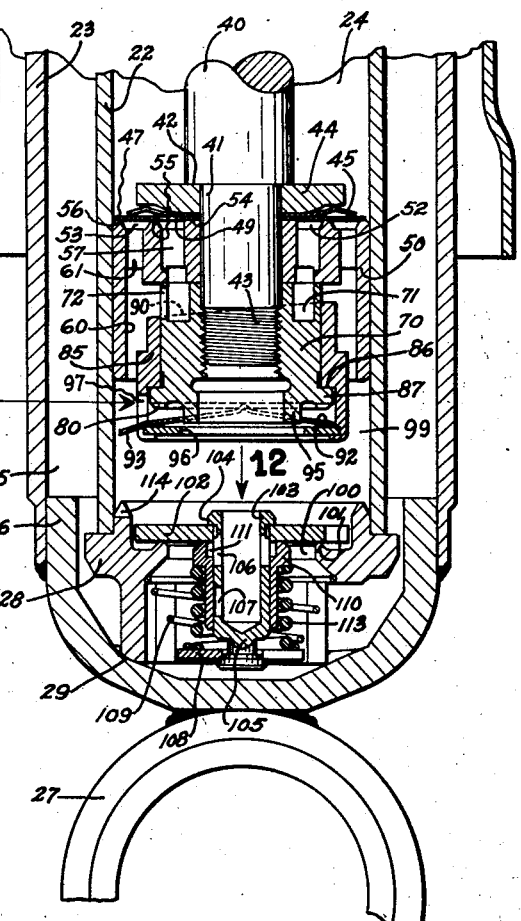
Fig. 3 is a fragmentary longitudinal sectional view of the shock absorber taken along the line 3—3 of Fig. 2.
Figure 12:
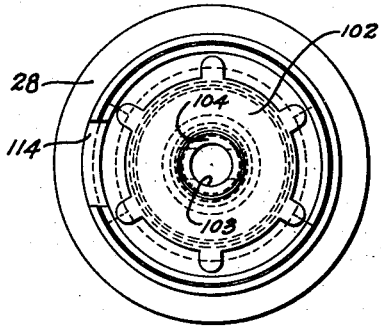

The Fig. 12 a detailed plan view of the lower cylinder head with its fluid flow controlling means, this view being taken substantially in the direction of the arrow 12 of Fig. 3.

As has been stated, the shock absorber is adapted to control approaching and separating movements of two relatively movable members, in this instance the frame 20 of a motor vehicle and the axle 21.

Figure 1:
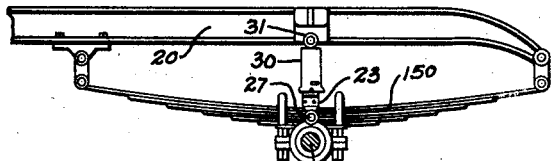
Fig. 1 is a fragmentary side view of a vehicle chassis, with wheels removed, showing the shock absorber of the present invention applied thereto.

The shock absorber comprises two concentrically spaced tubular members (22, the inner one, and 23, the outer one) which form a working cylinder 24 and a surrounding fluid reservoir 25. At the lower end of the outer tubular member 23 there is provided a closure member 26 having a mounting ring 27 secured thereto, this mounting ring being adapted to be secured to the vehicle axle 21 in any suitable manner. At the lower end of the tubular member 22 there is provided a cylinder head member 28 which rests within the closure member 26 at the point 29, thus properly centering the tubular member 22 within the tubular member 23. The upper ends of the tubular members 22 and 23 are provided with a closure head member similar in construction to the shock absorber illustrated and described in Patent 2,036,955, issued to J. E. Padgett, April 7, 1936, and no detailed description will be given inasmuch as this portion of the shock absorber does not enter into the features of the present invention. Like the patent just referred to, this shock absorber is provided with a dust cover, in the form of a tubular member 30, secured to the upper mounting ring 31 in any suitable manner, which mounting ring is attached to the vehicle frame 20 as shown in Fig. 1.

One end of the piston rod 40 is secured to the mounting ring 31. This rod 40 is slidably supported within the upper closure member and extends concentrically into the working cylinder 24. The lower end of the rod 40, or more specifically the end that extends into the cylinder 24, has a reduced diameter portion 41 presenting the annular shoulder 42. The end of this reduced diameter portion 41 is screw-threaded as at 43. A backing disc 44 is centrally apertured to fit upon the portion 41 of the piston rod and engages with the shoulder 42 thereon. Directly beneath this backing disc 44 there is provided the star-shaped resilient disc member 45 shown in plan view in Fig. 5, this disc being centrally apertured as at 46 to receive the portion 41 of the shaft 40.

The one fluid flow control device 47 of the piston is placed upon the shaft portion 41 directly beneath the resilient disc 45. As shown in Fig. 6, this fluid flow control device is centrally apertured as at 48 to receive the shaft portion mentioned. A C-shaped slot 49 is provided in the disc 47 concentric to the central opening 48. This fluid flow control device is flexible, being made up of any suitable thickness of flat spring material. Next the main piston block 50 is positioned on the piston rod portion 41, this block being shown in plan view in the Fig. 7. Like the discs 45 and 47, it has a central aperture 51 to receive said shaft portion. On the upper surface of the piston, or that surface in juxtaposition to the flexible disc-valve 47, there are provided two annular grooves 52 and 53 concentric to the central aperture 51. These grooves provide three annular ridges 54, 55 and 56, all lying in the same plane. A series of openings 57 pass through the piston block and provide communication between the annular groove 52 in the upper surface of the piston block and the recess 60 in the lower end of the piston block. As shown in Fig. 7, six of such passages are provided; however, more or less of them may be used in accordance with the requirements.

A series of similar passages 61 provided communication between the recess 60 in the lower end of the piston block and the annular groove 53 in the upper surface of said block.

From the aforegoing description and referring to Fig. 3 in particular, it may be seen that the flexible disc-valve 47 maintains passages 57 constantly open, for when said disc-valve is mounted upon the piston rod, the C-shaped slot 49 therein is constantly in alignment with the annular groove 52 from which the through passages 57 lead. It will also be noted that the outer peripheral portion of this disc-valve 47 is normally, yieldably urged upon the annular ridges 55 and 56 of the piston block by the resilient disc-member 45, thus said resilient disc-valve 47 normally, yieldably closes the outer annular groove 53 in the piston block from which through passages 61 lead.

To hold the piston block 50 so that the backing collar or disc 44 always engages shoulder 42 and the resilient disc 45 and flexible valve member 47 are tightly clamped between said backing disc or collar 44 and the annular ridge 54 of piston block 50, there is provided a retainer member or collar 70 which threadedly engages the portion 43 of the piston rod. This retainer collar is screwed upon the shaft so that its upper surface clamps tightly against the lower surface of the piston block 50, or more specifically the inner bottom surface of the recess 60 in said piston block. The end surface of said retainer element 70 engaging the piston block has an annular groove 71 provided thereon. This annular groove aligns and is in constant communication with the piston passages 57 which, as has been mentioned heretofore, are constantly maintained open by the flexible fluid flow control device or disc-valve 47 of the piston.

The outer annular wall defining recess 71 has a side opening 72 providing communication between the annular groove 71 and the outer part of the retainer 70 which lies within the confines of the recessed portion 60 of the piston, as shown in Fig. 3. The end of the retainer 70 opposite that engaging the piston block has a plurality of equally spaced and radially arranged ridges 80, shown in Figs. 3 and 9.

Figure 4:
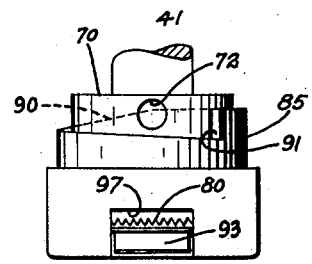
Fig. 4 is a fragmentary side view of the fluid flow controlling means associated with the shock absorber piston, the view being taken substantially in the direction of the arrow 4 of Fig. 3.

Another fluid flow control device is provided in the piston, this one being in the form of a sleeve 85 rotatably carried on the retainer element 70. A recess in the lower end of the sleeve element 85 provides a shoulder 86 which is adapted to rest on a corresponding shoulder formed on the retainer collar 70 by the outwardly extending flange 87 at its lower end. The upper edge of the sleeve element 85 extends over a portion of the side opening 72 in the outer wall of the retainer element 70. Extending over a portion of the opening 72, the sleeve member 85 will naturally restrict the fluid flow therefrom. In order to provide for a variable restriction as the sleeve element 85 is rotated from the retainer element 70, the upper edge of said sleeve element extending over a portion of the opening 72 is sloped, as shown at 90 in the Fig. 4 in particular, the deepest portion of this slope being indicated by the reference numeral 91 in Figs 4 and 10.

In order that the sleeve member 85 may not, of its own accord, rotate upon the retainer element 70 and vary its restriction to fluid flow from the opening 72, applicant has provided a yieldable locking member or detent 92, ring-shaped as shown in Fig. 11 having an outwardly extending tongue portion 93. This ring-shaped detent fits over a circular projection 95 at the bottom end of the retainer element 70 and rests upon an abutment ring 96 secured in the bottom recessed portion of the sleeve member 85. The tongue 93 of this detent extends through a side opening 97 in the sleeve member 85. The dents or humps 98 in the detent, on diametrically opposite sides thereof, yieldably, lockingly engage notches 80 in the retainer element 70. Thus it may be seen that this detent 92 yieldably holds the rotatable sleeve member 85 in any one of a plurality of adjusted positions upon the retainer 70. The sloping upper edge 90 of the sleeve member 85 provides a variable dam in front of the side opening 72 in the retainer 70 to restrict the fluid flow therefrom. The ring-shaped detent 92 clamped between the retainer 70 and the abutment washer 96 in the sleeve 85 is slightly dished so that normally it is tensioned, exerting a pressure upon the sleeve 85 to urge it so that its shoulder 86 constantly rides upon the shoulder provided by the flange 87 on the retainer 70. Due to this detent the sleeve 85 is not free to rotate on the retainer 70, but is yieldably held in adjusted position, and when rotated the humps or dents 98 of the detent will be moved from notch to notch provided by the annular row of radial ridges 80.

As has been said before, the lower end of the cylinder (tubular member 22) is provided with a head member 28. This head member has a port 100 providing communication between the lower displacement chamber 99 and the fluid reservoir 25. An annular ridge 101, extending upwardly into the cylinder, provides a valve-seat about this port 100. A valve device is provided for controlling the fluid flow through the port 100 in opposite directions. This valve device comprises a disc-valve 102, having a central aperture in which a tubular member 103 is slidably carried. The upper end of this tubular member has an outwardly extending flange 104 which normally rests upon the upper surface of the disc-valve 102, as shown in Fig. 3. The lower end of the tubular valve member 103 is closed as at 105. Two side openings 106 and 107 are provided in the wall of the tubular valve member 103. Adjacent its closed end a retainer collar 108 is provided, this collar forming an abutment for one end of the spring 109, the opposite end of said spring engaging the head member 28. This spring pressing upon the collar 108 normally yieldably urges the disc-valve 102 upon the valve seat 101 surrounding the port 100. Another valve 110 having a tubular body portion and an enlarged head portion, is slidably mounted on the tubular valve 103. It has an inner annular groove 111 in constant communication with the side opening 106 in the tubular valve 103. This valve member 110 is yieldably urged into engagement with the bottom surface of the disc-valve 102 by a spring 113 interposed between the valve 110 and the abutment collar 108.

Figure 2:
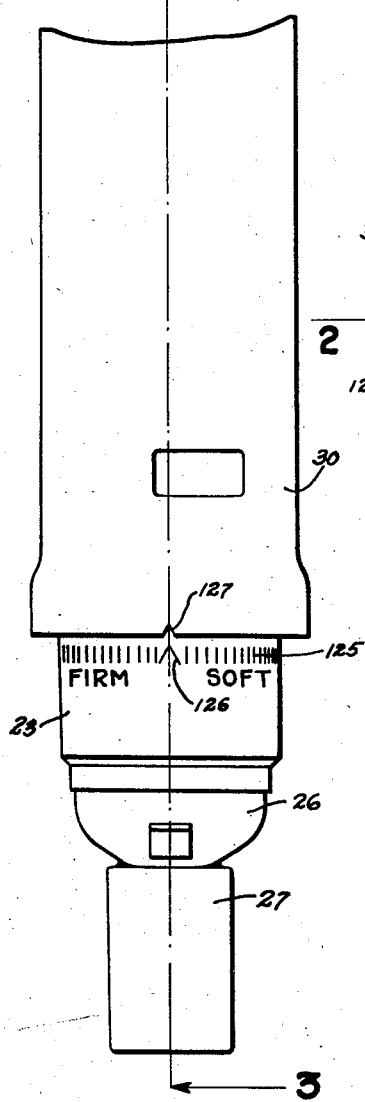
Fig. 2 is a fragmentary view of the lower end of the shock absorber taken substantially in the direction of the arrow 2 of Fig. 3.

As shown in Fig. 2, a series of equally spaced marks 125 are provided in the outer surface of the tubular member 23. These marks are spaced to correspond to the spacing of the radial notches 80 on the bottom surface of the retainer member 70. A central V-shaped marker 126 is provided in the row of markings 125, and on one side of this V-shaped marker 126 there appears the word "Firm" and on the opposite side the word "Soft". These are indications as to the adjustment of the sleeve valve 85 on the retainer 70, or more particularly as to the degree or amount of restriction offered by the sleeve valve 85 to the fluid flow through the side opening 72 in said retainer. A V-shaped notch 127 in the dust cover 30 cooperates with the marking 125 to indicate correct adjustment as will be described hereinafter.

This shock absorber functions in the following manner:

When the wheels of the vehicle strike an obstruction in the roadway over which the vehicle is being operated, the axle 21 secured to the frame 20 by vehicle springs 150 is thrust upwardly toward said frame, resulting in a movement of the piston 50 of the shock absorber toward the cylinder head member 28 for, as has been described heretofore, the piston rod 40 is connected with the frame 20 and the working cylinder tubular member 22 to the axle 21. Fluid within the chamber beneath the piston will have pressure exerted thereon, which pressure when attaining a predetermined value, will flex the disc-valve 47 against the effect of the resilient backing disc 45 from engagement with the annular ridges or valve seats 55 and 56 on the upper surface of the piston. This permits a flow of fluid from the chamber beneath the piston through passages 61 in the piston past the resilient disc valve 47, the restriction offered to this fluid flow by this valve being comparatively low. Due to the presence of the rod 40 in the chamber within the cylinder above the piston, not all the fluid displaced by the piston from the chamber 99 beneath it may be received by the upper chamber, and thus fluid pressure will be exerted within the tubular valve 103 through the side opening 106 therein against the bottom surface of the groove 111 in the valve member 110, urging it from engagement with the disc-valve 102 against the effect of spring 113 and thus permitting a flow of fluid from the annular groove 111 through the orifice presented between the valve 110 and the lower surface of the disc-valve 102 through the cylinder head member 28 into the reservoir 25. Naturally some fluid will flow from the lower chamber through the opening 72 in the retainer 70 and through the piston passages 57, C-slot 49 in the valve 47 into the upper chamber. From this it can be seen that the fluid flow from the lower chamber into the upper chamber is substantially free. However, the fluid flow from the lower chamber into the reservoir past the valve device controlling the port 100 in the cylinder head 28 is restricted to a greater degree. Thus the shock absorber will offer some restriction to the fluid flow from the chamber beneath the piston and consequently it will offer a resistance to the approaching movements between the frame and axle of the vehicle.

The springs 150 after being compressed in a manner just described, will assume their normal position with a rebounding movement, causing a separation between the axle and frame of the vehicle. During this separating movement the piston 50 of the shock absorber is moved in a direction away from the cylinder head member 28, exerting a pressure upon the fluid in the cylinder working chamber above the piston 50. Fluid pressure will assist in urging the flexible disc-valve 47 upon its seats 55 and 56 to close piston passages 61. However, due to the upward movement of the piston, fluid from the upper chamber enters piston passages 57 through the C-shaped slot 49 in the flexible disc-valve 47 and from said piston passages 57 this fluid will enter the annular groove 71 in the retainer 70. From this annular groove 71 the fluid exits through the side opening 72, thence through the recess of the piston into the lower displacement chamber. The degree of restriction to the fluid flow through the side opening 72 is governed by the position of the sleeve valve 85 on the retainer 70. If this sleeve valve 85 has been adjusted so that the deepest portion 91 of the sloping upper edge of the sleeve valve lies adjacent to the side opening 72, then the least restriction to fluid flow through this opening is obtained. However, if the sleeve valve 85 is adjusted so that a higher or more shallow portion of this slope lies adjacent the opening 72, naturally a portion of this sleeve valve will extend over a portion of the opening 72 and thus the fluid flow therethrough will be restricted to a greater degree. This restriction to fluid flow through opening 72 will resist the downward movement of the piston and consequently cause the shock absorber to resist the approaching movement between the axle and frame of the vehicle. In this case also the presence of the piston rod in the upper displacement chamber will become effective, for fluid displaced from the upper chamber into the lower chamber, as has been described, will not completely fill said lower chamber, consequently as the piston 50 is moved upwardly, an additional flow of fluid into the chamber therebeneath is permitted by the lifting of valve 102 from its seat 101 against the effect of spring 109, this flow coming from the reservoir 25 through the port 100 in the cylinder head member 28 past the valve 102 into the chamber 99 beneath the piston 50, this supply being, as has been mentioned, in addition to the flow transferred from the upper displacement chamber through the piston into the lower chamber.

In order to adjust the sleeve valve 85 so that it will more or less restrict the fluid flow through the side opening 72 in the retainer 70, it must be rotated on the retainer 70. Normally the detent 92 holds the sleeve 85 against rotation upon the retainer 70. When it is desired to make such an adjustment, the piston of the shock absorber is moved downwardly into juxtaposition with the cylinder head member 28 so that the tongue 93 will enter into and lockingly engage the notch 114 provided in the upper edge of the cylinder head member 28. Now the cylinder rod 40 may be rotated, causing rotation of the piston and the retainer 70 relatively to the sleeve 85, for sleeve 85 cannot rotate while the tongue 93 of the detent is in slot 114. If the piston rod 40 and consequently the dust cover 30, for dust cover and piston rod are both secured to a common member, are rotated to the left or toward the word "Firm", then the sloping edge 80 of the sleeve valve 85 will rise over the opening 72 in the retainer 70 causing a lesser area of it to be exposed and therefore increasing the restriction to fluid flow therethrough. If on the contrary the rod and cover are rotated toward the right as regards Fig. 2, or toward the "Soft position" then the lower or deeper part of the sloping upper surface 90 of the sleeve valve will approach the opening 72, causing a greater portion of it to be exposed and naturally reducing the restriction to the fluid flow through this opening. The normal adjustment is indicated when the V-shaped notch 127 in the dust cover is in direct alignment with V-shaped mark 126 on the tube 23, this adjustment being determined when assembling the shock absorber. As the ducts or humps 98 of the duct 92 are moved from one notch to the next adjacent notch formed by the ridges 80 on the retainer 70, the notch 127 on the dust cover will move from one mark of the indications 125 to the next adjacent one.

From the aforegoing it may be seen that a fluid flow control device of the shock absorber, which device is in the interior of the shock absorber, may be adjusted exteriorly thereof without disassembling the device. By merely disconnecting the shock absorber from either the frame or the axle of the vehicle and rotating either the piston relatively to the shock absorber or the cylinder relatively to the piston after the shock absorber has been collapsed, or more specifically after the piston has been brought into contact with the cylinder head 28, this valve device may be adjusted to increase or decrease the restriction to fluid flow as desired, thereby increasing or decreasing the resistance offered by the shock absorber to movements between the frame and axle of the vehicle.

It may also be seen that inasmuch as fluid flows in both directions through the orifice or opening 72 in response to the movement of the piston in both directions respectively, the approaching and separating movements of the vehicle frame and axle may be varied to suit the desire of the operator.

While the embodiment of the present invention as herein disclosed constitutes a preferred form, it is to be understood that other forms might be provided, all coming within the scope of the claims which follow.

What is claimed is as follows:

1. A hydraulic shock absorber comprising, in combination, a cylinder having a head member; a piston in said cylinder, provided with a fluid passage; a sleeve rotatably secured on the piston and adapted to throttle fluid flow through the piston passage; and means normally, yieldably holding said sleeve against rotation on the piston, but adapted to be brought into engagement with the cylinder head to hold the sleeve against movement while the piston is rotated, for changing the throttling effect of the sleeve upon fluid flow through the piston.

2. A hydraulic shock absorber comprising, in combination, a cylinder having a head member; a piston in said cylinder and having a plurality of fluid flow passages; a flexible disc-valve normally closing certain of said piston passages while maintaining the other of said passages open; control means adjustably carried by the piston for restricting the flow of fluid through said other piston passages; means yieldably holding the control means in adjusted position upon the piston, said means being adapted to be brought into locking engagement with the cylinder head by movement of the piston into juxtaposition thereto for holding said means stationary while the piston is rotated in the cylinder to alter the adjustment of said means relatively to said piston passages.

3. A hydraulic shock absorber comprising, in combination, a cylinder having a head member provided with a notch; a piston in said cylinder, having fluid flow passages; a valve for controlling the flow of fluid through certain of said passages while maintaining the others open; a sleeve-valve rotatably carried by the piston and adapted to restrict the flow of fluid through the said other piston passages; and means yieldably holding said sleeve-valve in adjusted position on the piston, said means being adapted to be moved into locking engagement with the cylinder head notch to hold the sleeve stationary while the piston is rotated to change the restriction to the flow of fluid through the piston by the sleeve-valve.

4. A hydraulic shock absorber comprising, in combination, a cylinder having a head member provided with a notch; a piston in said cylinder, having a plurality of fluid flow passages; a flexible disc-valve normally, yieldably closing certain of said passages while maintaining the other passages open; a sleeve-valve rotatably carried by the piston, said sleeve-valve having a sloping surface providing a restriction to the flow of fluid through said other piston passages; and a detent yieldably holding the sleeve-valve against rotation on the piston, said detent being adapted to be brought into locking engagement with the notch in the cylinder head when the piston is moved into juxtaposition with the said head member, thereby permitting the piston to be rotated relatively to the sleeve-valve to vary its restriction to the fluid flow.

5. A hydraulic shock absorber of the direct-acting type, having concentrically arranged tubular members forming a fluid reservoir and a working cylinder; a head member for the cylinder, having a port providing communication with the reservoir; a valve device for said port controlling the flow of fluid through said port in both directions; a piston in said cylinder, provided with an actuating rod, said piston having fluid passages; a flexible disc-valve yieldably, normally closing certain of said piston passages; a retainer threadedly secured to the piston rod and clamping the piston securely in position thereon, said retainer having an annular groove in communication with the other of said piston passages and an opening in its side wall, leading into said annular groove; a sleeve valve rotatably secured to the retainer and having means for restricting the flow of fluid from the opening in the retainer; and a detent engaging both the retainer and the sleeve valve, yieldably holding the latter in adjusted position on the retainer and adapted to engage the head member of the cylinder when the piston is moved into juxtaposition thereto for holding the sleeve-valve stationary while the retainer and piston are rotated, thereby varying the restriction to fluid flow by said sleeve-valve.

6. A hydraulic shock absorber comprising, in combination, a cylinder having a head member provided with a notch; a piston in said cylinder having fluid flow passages; a piston rod for actuating the piston; a retainer threaded on the rod and securing the piston thereon, said retainer having an annular groove in the surface engaging the piston, certain piston passages communicating with said groove, the retainer having an opening in its side wall leading into said groove; a sleeve rotatably supported by the retainer so that the one end of the sleeve extends over said opening a portion of the surface of said one end of the sleeve sloping circumferentially; an annular row of radially arranged and equally spaced ridges on the end surface of the retainer more remote from the piston; and a ring-shaped detent, having diametrically opposite ducts engaging the ridges on the retainer, said detent having a tongue extending through a slot in the sleeve, said tongue being adapted to engage the notch in the cylinder head when the piston is moved in juxtaposition thereto for holding said sleeve stationary as the piston is rotated to the restriction of the retainer opening by said sleeve.

7. A hydraulic shock absorber, comprising in combination, a cylinder having a head member; a piston in said cylinder provided with a fluid passage; means for retricting the flow of fluid through said passage; and a flexible member yieldably securing the restricting means to the piston and having provisions adapted to be engageable with the cylinder head member for holding the restricting means stationary while the piston is rotated.

8. A hydraulic shock absorber comprising in combination, a cylinder having a head member; a piston in said cylinder provided with a fluid passage; a fluid flow restricting means for said passage, adjustably carried by the piston; and a flexible wedge interposed between the restricting means and the piston, urging the said means into proper position longitudinally relatively to the piston passage and yieldably holding said restricting means non-rotatable on said piston, said flexible wedge having a portion adaptable to be moved into engagement with the cylinder head to hold said restricting means immovable while the piston is rotated relatively to the cylinder head.

9. A hydraulic shock absorber comprising, in combination, a cylinder head having a head member provided with a notch; a piston in said cylinder having a fluid passage therethrough; a throttle for said fluid passage, and a resilient wedge for yieldably locking the throttle against rotation relatively to the piston, and having an extension adapted to be moved into locking engagement with the notch of the cylinder head to hold the throttle against rotation while the piston is being rotated relatively to the cylinder.

EDWIN F. ROSSMAN.
FREDERICK D. FUNSTON.